United States Patent [19]

Nishino et al.

[11] 3,764,561
[45] Oct. 9, 1973

[54] ACTIVATED CARBON FROM ADMIXTURE OF COKING COAL AND INORGANIC POTASSIUM SALTS

[75] Inventors: Hiroshi Nishino, Nishinomiya; Hakaru Kubo, Takatsuki; Hirohiko Ichikawa, Kyoto, all of Japan

[73] Assignee: Takeda Chemical Industries, Ltd., Higashi-ku, Osaka, Japan

[22] Filed: Mar. 9, 1971

[21] Appl. No.: 122,548

Related U.S. Application Data

[63] Continuation-in-part of Ser. No. 37,441, May 15, 1970, abandoned, which is a continuation of Ser. No. 663,220, Aug. 25, 1967, abandoned.

[52] U.S. Cl. ............... 252/447, 252/425, 252/445
[51] Int. Cl. ... C01b 31/08, C01b 31/12, B01j 11/06
[58] Field of Search ............... 252/447, 445, 425, 252/421, 422

[56] References Cited
UNITED STATES PATENTS

| | | | |
|---|---|---|---|
| 3,492,244 | 1/1970 | Fujiwara et al. | 252/425 |
| 3,329,626 | 7/1967 | Teter et al. | 252/445 |
| 3,340,316 | 9/1967 | Wackher et al. | 260/674 |
| 2,894,914 | 7/1959 | Hassler et al. | 252/425 |

FOREIGN PATENTS OR APPLICATIONS

| | | | |
|---|---|---|---|
| 129,083 | 10/1932 | Netherlands | 252/421 |
| 291,043 | 3/1929 | Great Britain | 252/422 |
| 500,981 | 6/1930 | Germany | 252/421 |
| 506,522 | 9/1930 | Germany | 252/425 |
| 588,811 | 6/1947 | Great Britain | 252/425 |

*Primary Examiner*—Daniel E. Wyman
*Assistant Examiner*—P. E. Konopka
*Attorney*—Wenderoth, Lind & Ponack

[57] ABSTRACT

Coking coal is admixed with a small but critical amount of inorganic potassium salt, followed by subjecting the mixture to a carbonization to produce a coke which is convertible to activated carbon showing a strong absorption capacity in gas phase.

6 Claims, No Drawings

ACTIVATED CARBON FROM ADMIXTURE OF COKING COAL AND INORGANIC POTASSIUM SALTS

This is a continuation-in-part of Ser. No. 37,441, filed May 15, 1970, now abandoned, which is a continuation of Ser. No. 663,220 filed Aug. 25, 1967, now abandoned.

This invention relates to a novel method for the production of coke, and, more particularly, to a method for the production of coke which comprises adding inorganic potassium salt to coking coal, i.e., coke-forming or coking coal, having a grain size of below 660 microns ($\mu$) and subsequently subjecting the mixture to a low temperature carbonization.

In hitherto-known methods, the production of activated carbon from coal has been accompanied with various disadvantages, e.g., weak adsorption capacity of activated carbon, requirement of many troublesome processes for its production, etc. As coal is relatively cheap, the successful production of activated carbon of high quality from coal is a desideratum in many industrial fields.

Activated carbon of high quality can be produced by using the specific coke obtained by (1) employing coking coal, the grain size of which is below 660 $\mu$ as the starting material, (2) adding inorganic sodium salt to said coking coal, and (3) subjecting the mixture to a low temperature carbonization. Thus-produced activated carbon has a strong adsorption capacity in the liquid phase, but is not so strong in adsorption capacity in the gas phase. Therefore the said activated carbon cannot advantageously be applied to technical fields requiring a strong adsorption capacity in the gas phase.

One of the objects of this invention is to provide a method for producing a specific coke which shows a strong latent adsorption structure and can be converted to activated carbon having strong adsorption capacity, especially in the gas phase. This object is realized by adding 0.8 to 2.5 percent by weight of inorganic potassium salt to coking coal having a grain size of below 600 $\mu$ and subsequently subjecting the mixture to a low temperature carbonization.

Otherwise stated, activated carbon produced according to this invention by using inorganic potassium salt in place of inorganic sodium salt in the abovementioned process has much strong adsorption capacity in the gas phase than that produced by using inorganic sodium salt.

Thus the activated carbon derived from the present coke can advantageously be applied to a technical field to which the activated carbon derived from the abovementioned prior coke cannot satisfactorily be applied.

In the method of this invention, the grain size of the coking coal is one of the most important factors in the realization of the object of this invention. The fact is clarified by the following test:

Test

To the respective coking coal shown in the following Table 1, there is added 3 percent by weight of potassium carbonate. The mixture is subjected to carbonization at 600° C for 4 to 5 hours. Thus-obtained coke is activated by the conventional means for the production of activated carbon (steam activation at about 800 to 1,000° C), whereby activated carbon is produced. The adsorption capacity of thus-produced activated carbon is examined by the following method:

a. Test of adsorption capacity by employing acetone

Dry air which contains 37.5 grams of acetone per cubic meter is passed through activated carbon at a thermostat-controlled temperature of 25° C. The inflow is continued until the equilibrium state is attained. The adsorption capacity of the activated carbon is expressed by the weight percent of acetone adsorbed.

b. Test of adsorption capacity by employing benzene

The same procedure as in Test (a) is carried out using 33.6 grams of benzene per cubic meter in place of 37.5 grams of acetone per cubic meter.

Results of Tests (a) and (b) are shown in Table 1:

TABLE 1

| Section | Average grain size of coal ($\mu$) | Acetone-adsorption capacity (weight %) | Benzene-adsorption capacity (weight %) |
|---|---|---|---|
| 1 | 5613–1651 | 13.0 | 14.9 |
| 2 | 1650–833 | 18.8 | 21.8 |
| 3 | 832–589 | 25.0 | 29.3 |
| 4 | 588–246 | 29.0 | 35.1 |
| 5 | 245–147 | 29.2 | 35.9 |
| 6 | 146–74 | 29.3 | 36.5 |
| 7 | <73 | 30.0 | 37.5 |

From the foregoing results, it is clear that coal of grain size smaller than 600 $\mu$ can give activated carbon having much higher adsorption capacity in comparison with coal of average grain size larger than about 600 $\mu$. The lower limit of grain size in coal is about 10 $\mu$ since coal of grain size smaller than 10 $\mu$ is not practically used industrially.

When inorganic potassium salt is not added to the coking coal, the adsorption capacity of the activated carbon does not vary with the difference of the grain size of the coking coal, but is kept constant (acetone-adsorption capacity = 10 percent; benzene-adsorption capacity = 11.2 percent.

In the present invention, coking coal is used, but upon necessity, the coking coal may be employed in admixture with non-coking coal or pitch.

In the method of this invention, inorganic potassium salt is added to the coking coal and intimately admixed therewith. As the inorganic potassium salt, there is employed, for example, potassium hydroxide, potassium carbonate, potassium bicarbonate, potassium sulfate, potassium nitrate, potassium chloride, potassium bromide, potassium iodide, potassium permanganate, potassium cyanide, potassium bichromate and the like. A single one or an admixture of two or more of these potassium salts is used. The amount of inorganic potassium salt to be added must be within the range of from about 0.8 to about 2.5 percent by weight, in terms of potassium atom relative to the coking coal. The inorganic potassium salt is employed in the form of an aqueous solution or in the form of solid.

The following results show the adsorption capacity when the amount of potassium atom is altered in various ways:

Test Method

To coking coal, the grain size of which is below 600 $\mu$, there is added potassium carbonate in the amount shown in Table 2 respectively. Then the mixture is subjected to carbonization at 600° C for 4 to 5 hours. Thus-obtained coke is activated by conventional steam activation. The adsorption capacity of thus-obtained activated carbon is examined in the same way as set forth above.

The superiority of potassium to sodium salts within the critical range is apparent from the following table:

TABLE 2

| Amount of potassium or sodium atom employed (%) | Acetone-adsorption capacity (% by weight) | | Benzene-adsorption capacity (% by weight) | |
|---|---|---|---|---|
| | potassium | sodium*2 | potassium | sodium*2 |
| 0 | 10.0 | 10.0 | 11.2 | 11.2 |
| 0.2 | 13.3 | 14.0 | 15.8 | 16.0 |
| 0.4 | 18.1 | 20.0 | 22.0 | 23.8 |
| 0.8 | 27.3 | 23.0 | 32.0 | 26.8 |
| 1.2 | 30.2 | 23.0 | 36.3 | 27.1 |
| 1.6 | 29.7 | 20.0 | 36.7 | 23.4 |
| 2.0 | 28.1 | 18.0 | 35.3 | 21.1 |
| 2.4 | 26.3 | 15.5 | 33.1 | 18.0 |
| 2.5 | 26.1 | 14.6 | 32.0 | 17.4 |
| 2.8 | 23.6 | 14.0 | 29.8 | 16.3 |
| 3.2 | 20.7 | *¹12.0 | 26.2 | |

(*1 When sodium carbonate is employed in an amount more than 3.2 percent by weight, the coke produced is not in massive (lump) form but in powdery form.)
(*2 The same procedure as in the Test Method is carried out using sodium carbonate in place of potassium carbonate.)

The mixture of the said coking coal and inorganic potassium salt is then subjected to low temperature carbonization. In the method of this invention, elevation of the temperature of the carbonization is preferably effected gradually. Advantageously the highest temperature of the carbonization is at about 900° C, and optimally at about 450°-700° C. Time required for the carbonization is generally from about 4 to about 20 hours.

Activation of the coke of this invention can also be carried out by conventional so-called "steam activation" at about 800°-1,000° C. The steam activation can be carried out by the use of steam only, a mixture of steam with air, or a mixture of steam and carbon dioxide, duel gas or the like.

Activated carbon produced from thus-obtained coke of this invention shows a strong adsorption capacity, especially adsorption capacity in gas phase, which is of the same magnitude as or even superior to that of activated carbon produced from charcoal. Further, the density of the activated carbon produced from the coke of this invention is about 1.2 to 1.5 times as high as that of activated carbon produced from charcoal. Further, the loss of raw material to be purified by the adsorption process using the activated carbon in this invention is small; adsorption equipment is small and the waste content of the activated carbon is small. Moreover, the reaction velocity at the production of activated carbon from the coal of this invention is about 1.5 to 2.0 times as high as that from charcoal.

The following examples are only illustrative and are not meant to restrict the scope of this invention. Throughout the specification, the abbreviations "kg", "g", "ml," "cm," "m" and "$\mu$" represent "kilogram(s)," "gram(s)," "milliliter(s)," "centimeter(s)," "meter(s)" and "micron(s)," respectively.

EXAMPLE 1

A box made from iron (0.1 m × 0.3 m × 0.4 m) is packed with a mixture of 5.82 kg of powdery coking coal having a grain size of below 600 $\mu$ and of 0.18 kg of powdery potassium carbonate, and is heated by means of fuel gas until the outer temperature becomes 600° C. Then the box is subjected to carbonization until the inner temperature of the box becomes 550° C, for about 4 hours, whereby 4.3 kg of massive coke is obtained.

EXAMPLE 2

To 5.80 kg of coking coal having a grain size below 600 $\mu$, there is added 0.20 kg of powdery potassium nitrate. The mixture is treated in the same way as in Example 1, whereby 4.2 kg of massive coke is produced. Thus-produced coke is subjected to steam activation at 900°-1000° C whereby activated carbon showing acetone-adsorption capacity and benzene-adsorption capacity at 32.0 and 40.0 percent, respectively, is obtained.

EXAMPLE 3

To 3.88 kg of a mixture of coking coal having a grain size below 600 $\mu$ and non-coking coal in the ratio of 85:25, there is added an aqueous solution of 0.12 kg of potassium carbonate, followed by mixing thoroughly. Thus-obtained powder is put into a rotary furnace (0.3 m in diameter; 0.5 m in length) which is heated to 600° C. Carbonization is continued until the inner temperature becomes 550° C, for about 4 ours, whereby 2.81 kg of massive coke is obtained.

EXAMPLE 4

To 5.84 kg of coking coal having a grain size below 600 $\mu$, there is added 0.16 kg of powdery potassium sulfate anhydride. The mixture is treated in the same way as in Example 1, whereby 4.25 kg of massive coke is produced. Activated carbon produced from the said coke by a similar manner to that of Example 2 shows acetone-adsorption capacity and benzene-adsorption capacity at 24 and 28 percent, respectively.

EXAMPLE 5

To 5.86 kg of coking coal having a grain size below 600 $\mu$, there is added 0.14 kg of powdery potassium chloride. The mixture is treated in the same way as in Example 1, whereby 4.20 kg of massive coke is produced. Activated carbon produced from the said coke shows acetone-adsorption capacity and benzene-adsorption capacity at 26 and 31.5 percent, respectively.

EXAMPLE 6

To 5.80 kg of the coking coal having a grain size below 600 $\mu$, there is added 0.20 kg of powdery potassium permanganate. The mixture is heated not higher than 100° C and then treated in the same way as in Example 1, whereby 4.10 kg of massive coke is obtained. Activated carbon produced from the said coke shows acetone-adsorption capacity and benzene-adsorption capacity at 29 and 35.5 percent, respectively.

Activated carbon obtained from the present coke can be used for recovering acetone from acetone-containing air which is generated from, e.g., spinning machines for spinning cellulose acetate fiber by the dry-spinning method employing acetone as solvent. For example, air containing acetone (37.5 grams per cubic meter) which is generated from an apparatus (10 tons per day scale) for producing cellulose-acetate fibers by the dry spinning method is passed through a series of three columns (each column measuring 7 meters in outside diameter and being packed with 7.06 tons of the present activated carbon) at a speed (linear velocity) of 9.275 meters per second, whereby 98 percent of the acetone is recovered.

What is claimed is:

1. Activated carbon produced by steam-activation at about 800° to 1000°C. of a carbonized admixture of coking coal having a grain size between about 10 $\mu$ to about 600 $\mu$ and an inorganic potassium salt, which admixture had been carbonized prior to said steam activation; the amount of said inorganic potassium salt being in the range of from about 0.8 to about 2.5 percent by weight of potassium relative to the coking coal.

2. The activated carbon of claim 1, wherein the inorganic potassium salt is a member selected from the class consisting of potassium hydroxide, potassium carbonate, potassium bicarbonate, potassium sulfate, potassium nitrate, potassium chloride, potassium bromide, potassium iodide, potassium permanganate, potassium cyanide and potassium bichromate.

3. The activated carbon of claim 1, wherein the inorganic potassium salt is potassium carbonate.

4. The activated carbon of claim 1, wherein the inorganic potassium salt is potassium sulfate.

5. The activated carbon of claim 1, wherein the inorganic potassium salt is potassium hydroxide.

6. The activated carbon of claim 1 wherein said admixture of coking coal and inorganic potassium salt is carbonized at 450° to 700°C.

* * * * *